United States Patent
Arnoldi et al.

(10) Patent No.: US 11,371,519 B2
(45) Date of Patent: Jun. 28, 2022

(54) WATER PUMP AND METHOD FOR MANUFACTURING A WATER PUMP

(71) Applicant: HANON SYSTEMS EFP DEUTSCHLAND GMBH, Bad Homburg v. d. Höhe (DE)

(72) Inventors: Ernesto Giovanni Arnoldi, Luserna S. Giovanni (IT); Paolo Lincoln Maurino, Bagnolo Piemonte (IT)

(73) Assignee: HANON SYSTEMS EFP DEUTSCHLAND GMBH, Bad Homburg v. d. Höhe (DE)

( * ) Notice: Subject to any disclaimer, the term of this patent is extended or adjusted under 35 U.S.C. 154(b) by 0 days.

(21) Appl. No.: 16/762,520

(22) PCT Filed: Oct. 19, 2018

(86) PCT No.: PCT/EP2018/078808
§ 371 (c)(1),
(2) Date: May 8, 2020

(87) PCT Pub. No.: WO2019/091763
PCT Pub. Date: May 16, 2019

(65) Prior Publication Data
US 2020/0271121 A1  Aug. 27, 2020

(30) Foreign Application Priority Data
Nov. 13, 2017  (DE) .................... 10 2017 220 157.6

(51) Int. Cl.
*F04D 29/02* (2006.01)
*F04D 13/06* (2006.01)
(Continued)

(52) U.S. Cl.
CPC ....... *F04D 29/026* (2013.01); *F04D 13/0653* (2013.01); *F04D 13/0686* (2013.01);
(Continued)

(58) Field of Classification Search
CPC ...... F04D 29/026; F04D 29/426; F04D 13/06; F04D 13/0606; F04D 13/0626;
(Continued)

(56) References Cited

U.S. PATENT DOCUMENTS

| 5,049,770 A | 9/1991 | Gaeth et al. |
| 5,949,171 A * | 9/1999 | Horski ................ F04D 29/5806 |
| | | 310/216.105 |

(Continued)

FOREIGN PATENT DOCUMENTS

| CN | 105262263 A | 1/2016 |
| CN | 105337454 A | 2/2016 |

(Continued)

OTHER PUBLICATIONS

German Office Action (with English translation) for Application No. 102017220157.6 dated Apr. 24, 2020.

(Continued)

*Primary Examiner* — Dominick L Plakkoottam
(74) *Attorney, Agent, or Firm* — Harness, Dickey & Pierce, P.L.C.

(57) ABSTRACT

Water pump with an impeller driven by an electrical machine comprising a housing cap and a volute with an input and an output and a boot hosting a stator and a rotor of the electrical machine and an electronic board mounted at the side apart from the impeller and covered by the cap housing, characterized in that the stator stack is over molded with a first plastic material and at least the stator stack, the wires and pins are over molded with a second plastic material to form a cylindrical ring boot and a heat sink that seals a cylindrical opening of the boot.

12 Claims, 8 Drawing Sheets

Figure 1:
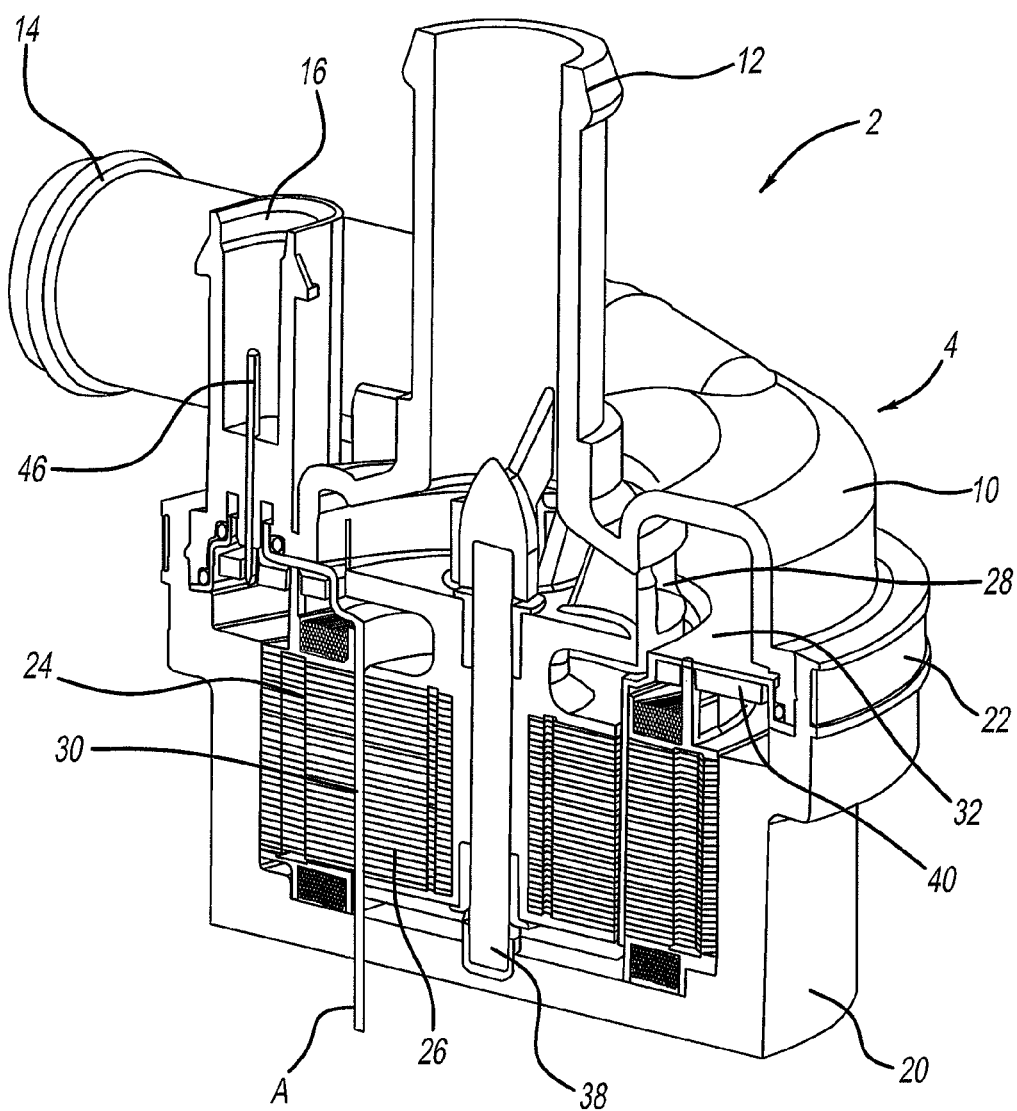

(51) Int. Cl.
*H02K 15/10* (2006.01)
*H02K 5/10* (2006.01)
*H02K 7/14* (2006.01)

(52) U.S. Cl.
CPC ........... *F04D 13/0693* (2013.01); *H02K 5/10* (2013.01); *H02K 7/14* (2013.01); *H02K 15/10* (2013.01); *F05D 2300/43* (2013.01)

(58) Field of Classification Search
CPC .. F04D 13/0653; F04D 29/588; F04D 29/628; H02K 11/33; H02K 5/10; H02K 15/10; H02K 15/14; H02K 5/02; H02K 5/08
See application file for complete search history.

(56) References Cited

U.S. PATENT DOCUMENTS

| | | | | |
|---|---|---|---|---|
| 7,323,835 | B2* | 1/2008 | Hazelton | H02K 29/08 318/400.38 |
| 8,979,504 | B2* | 3/2015 | Snider | F04D 13/0633 417/53 |
| 9,360,015 | B2* | 6/2016 | Muizelaar | F04D 29/426 |
| 9,587,647 | B2* | 3/2017 | Lee | H02K 9/227 |
| 10,100,693 | B2* | 10/2018 | Ryu | F04D 13/06 |
| 2004/0031141 | A1* | 2/2004 | Miller | H02K 5/08 29/596 |
| 2004/0108779 | A1* | 6/2004 | Boettger | H02K 5/15 310/89 |
| 2005/0214135 | A1* | 9/2005 | Shibuya | F04D 13/064 417/357 |
| 2007/0237660 | A1* | 10/2007 | Akiyoshi | F04D 13/0626 417/423.11 |
| 2009/0022610 | A1* | 1/2009 | Materne | H02K 11/33 417/423.7 |
| 2009/0167101 | A1* | 7/2009 | Saga | H02K 3/522 310/45 |
| 2012/0181881 | A1* | 7/2012 | Jones | H02K 11/33 310/43 |
| 2012/0230850 | A1* | 9/2012 | Kawano | F04B 17/03 417/410.1 |
| 2013/0028760 | A1 | 1/2013 | Lin | |
| 2013/0039783 | A1* | 2/2013 | Wagner | F04D 29/263 417/313 |
| 2013/0136628 | A1* | 5/2013 | Lee | F04D 13/06 417/357 |
| 2013/0195696 | A1* | 8/2013 | Sugimura | H02K 11/33 417/410.1 |
| 2013/0213325 | A1* | 8/2013 | Kim | F01P 5/10 123/41.44 |
| 2013/0306072 | A1* | 11/2013 | Moir | F04D 17/16 415/203 |
| 2015/0349594 | A1* | 12/2015 | Zhang | F04D 13/06 417/423.7 |
| 2016/0248292 | A1* | 8/2016 | Takarai | H05K 9/0015 |
| 2016/0308407 | A1 | 10/2016 | Mahler | |
| 2017/0093252 | A1* | 3/2017 | Otsubo | H02K 5/128 |
| 2018/0323674 | A1* | 11/2018 | Carroll | H02K 5/128 |
| 2018/0375400 | A1* | 12/2018 | Ahrens | H02K 5/08 |
| 2021/0270272 | A1* | 9/2021 | Arnoldi | F04D 13/0633 |

FOREIGN PATENT DOCUMENTS

| | | |
|---|---|---|
| DE | 4109548 A1 | 10/1991 |
| DE | 102006008423 A1 | 8/2007 |
| EP | 1422809 A2 | 5/2004 |
| EP | 2882077 A1 | 6/2015 |
| WO | 2004008603 A2 | 1/2004 |
| WO | WO-2008072438 A1 | 6/2008 |

OTHER PUBLICATIONS

Office Action regarding Korean Patent Application No. 520140231346, dated Jun. 11, 2021.
European Office Action regarding Patent Application No. 18795352. 6, dated Mar. 4, 2022.

* cited by examiner

WATER PUMP AND METHOD FOR MANUFACTURING A WATER PUMP

CROSS-REFERENCE TO RELATED APPLICATIONS

This application is a 371 U.S. National Phase of International Application No. PCT/EP2018/078808, filed Oct. 19, 2018, which claims the benefit of German Patent Application No. 10 2017 220 157.6, filed Nov. 13, 2017. The entire disclosures of each of the above applications are incorporated herein by reference.

FIELD

The disclosure is related to a water pump with an impeller driven by an electrical machine comprising a housing cap and a volute with an input and an output and a boot hosting a stator and a rotor of the electrical machine and an electronic board mounted at the side apart from the impeller and covered by the cap housing, wherein the stator stack is over molded.

The disclosure is also related to a method to produce the water pump.

BACKGROUND

This section provides background information related to the present disclosure which is not necessarily prior art.

Generally, water pumps include a stator and rotor. The rotor is in communication with an impeller for moving a fluid. The fluid enters the pump through an inlet in a volute, contacted with an impeller and moved through an outlet in the volute. The rotor and stator are contained with a housing that connects with the volute. Generally, the rotor and stator are separated by a magnetic air gap and the rotor and stator include rare earth metals so that magnetic air gap between the rotor and stator may be bridged so that the rotor is rotated during use and so that the rotor, the stator, or both may be isolated from the fluids during use and continue to operate. However, the use of rare earth metals may be damaged by the fluid such that the rare earth metals may require additional packaging so that damage is prevented.

U.S. Pat. No. 9,360,015 B1 discloses an electric water pump, and more specifically an electric water pump having an improved wet sleeve so that the water pump is free of a housing. The electric water includes a pump rotor having a shaft. A wet sleeve surrounds the rotor and has a cap, a sleeve that houses the rotor, and a seat in communication with the shaft of the rotor so that the seat assists in supporting the shaft a stator. Surrounding the wet sleeve and the rotor is a volute covering an upper portion of the rotor, wet sleeve, and stator. The electric water pump further includes a rubber boot covering a lower portion of the rotor, wet sleeve, and stator and is in communication with the volute forming a cover.

SUMMARY

This section provides a general summary of the disclosure, and is not a comprehensive disclosure of its full scope or all of its features The objective of the disclosure is to provide a water pump with an optimized design, especially with integrated parts.

The solution provided is a water pump with an impeller driven by an electrical machine comprising a housing cap and a volute with an input and an output and a boot hosting a stator and a rotor of the electrical machine and an electronic board mounted at the side apart from the impeller and covered by the cap housing, wherein the stator stack is over molded with a first plastic material and at least the stator stack, the wires and pins are over molded with a second plastic material to form a cylindrical ring boot and a heat sink that seals a cylindrical opening of the boot.

The disclosure allows a device assembly with reduced parts and reduced effort. Due to the fact that part are completely over molded the heat transfer is better. This also due to the fact that dimension can be reduced and the weight of the water pump is lower compared to standard die casted pumps. The pump has a high resistance to vibrations.

The complete over molding of the stator eliminates the air trapped between the components as stator stack, pins and copper wires increasing the heat dissipation.

It is advantageous that the heat sink is a separate device bearing a rotor shaft.

The simple assembly eliminates at least on sealing.

Alternatively it is of advantage that the heat sink is a device bearing a rotor shaft and is molded together with the boot. In this case of pump variant for low temperature application also the heatsink is integrated and two sealing could be eliminated.

It is advantageous that the electronic board is over molded together with the stator in a method to produce the water pump. The volume of air trapped in the compartment of the electronic board has been reduced for two scopes: increasing the heat transfer and reduce the overall volume in case it is needed to fill it with resin to keep the components stable for engine-mounting applications.

It is advantageous that the boot has a rim that allows the volute and the cap housing to be connected. The connection is realized with a snap-fit design, to secure the cap housing and the volute in a stable position without needs of screws/screwing operations.

For this purpose it is advantageous that the rim comprises at least slots for an insert of hooks.

The disclosure also comprise a method to produce a water pump according the previous claims comprising the steps:
Over molding stator stack with a first plastic material,
Mounting at least wires and pins,
Over molding the mounted stator with a second plastic material to form a cylindrical ring boot with a rim,
Sealing of the inner cylindrical opening by a heat sink.

DRAWINGS

The drawings described herein are for illustrative purposes only of selected embodiments and not all possible implementations, and are not intended to limit the scope of the present disclosure.

The disclosure is described in the figures and the following description.

Figure 2:
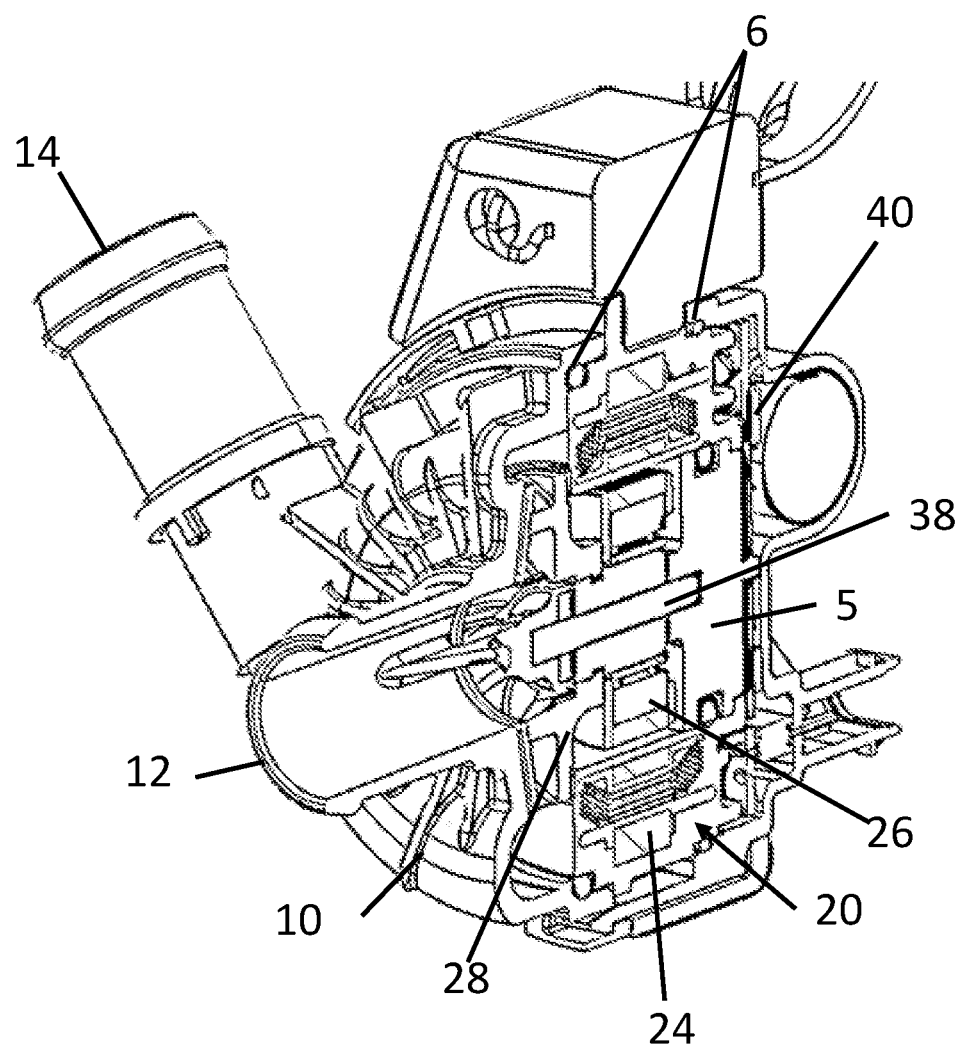
Figure 3:
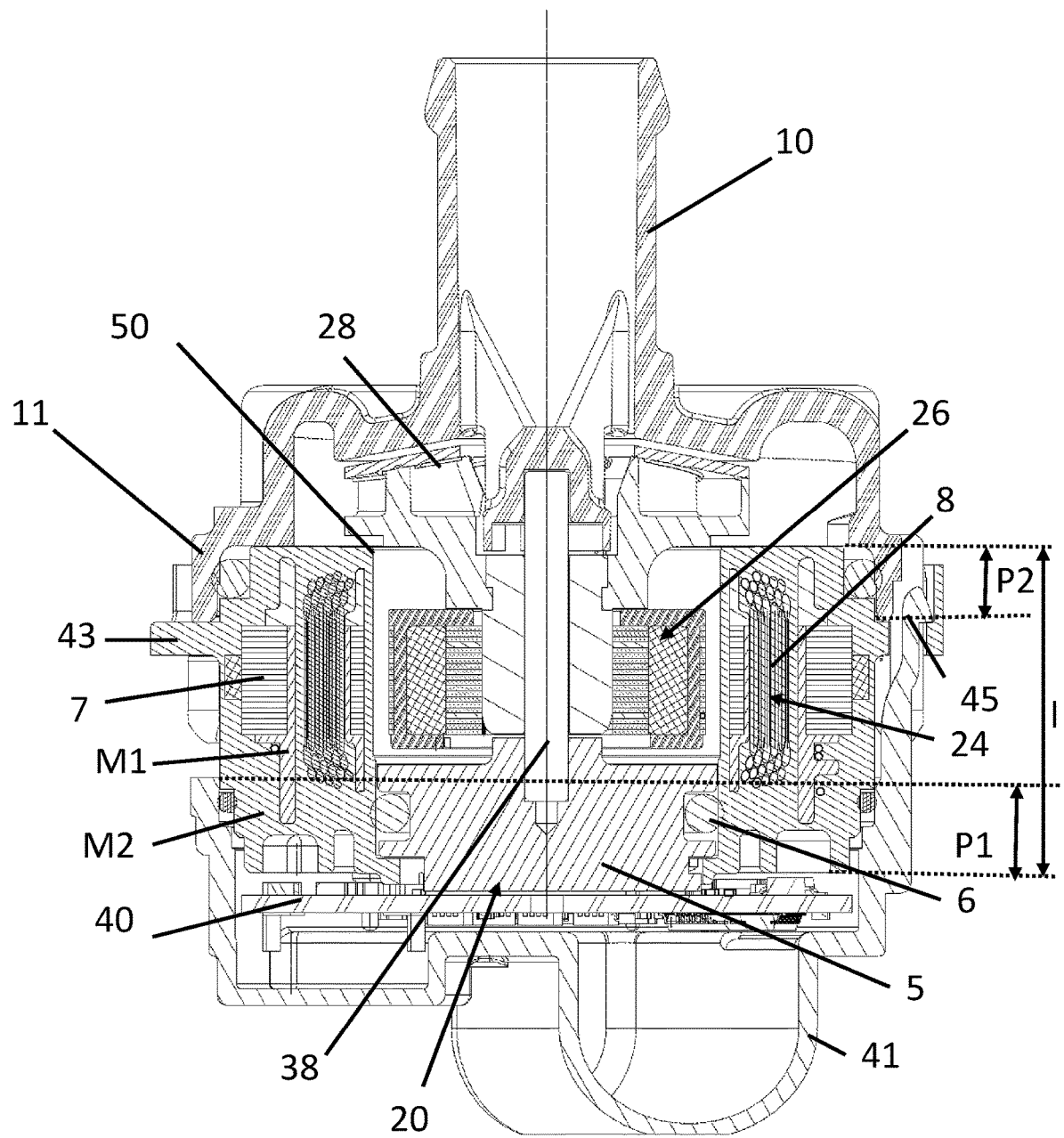
Figure 4:
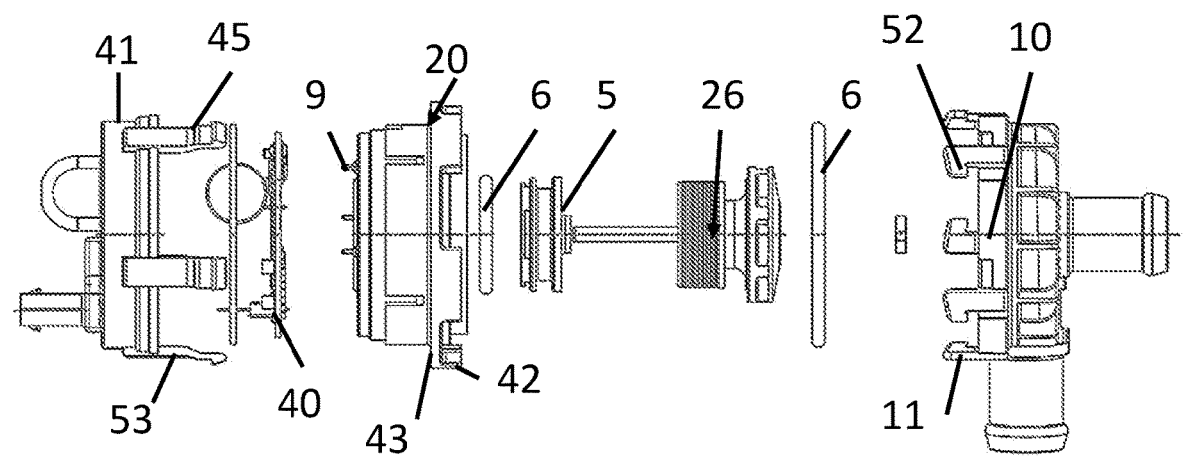
Figure 5:
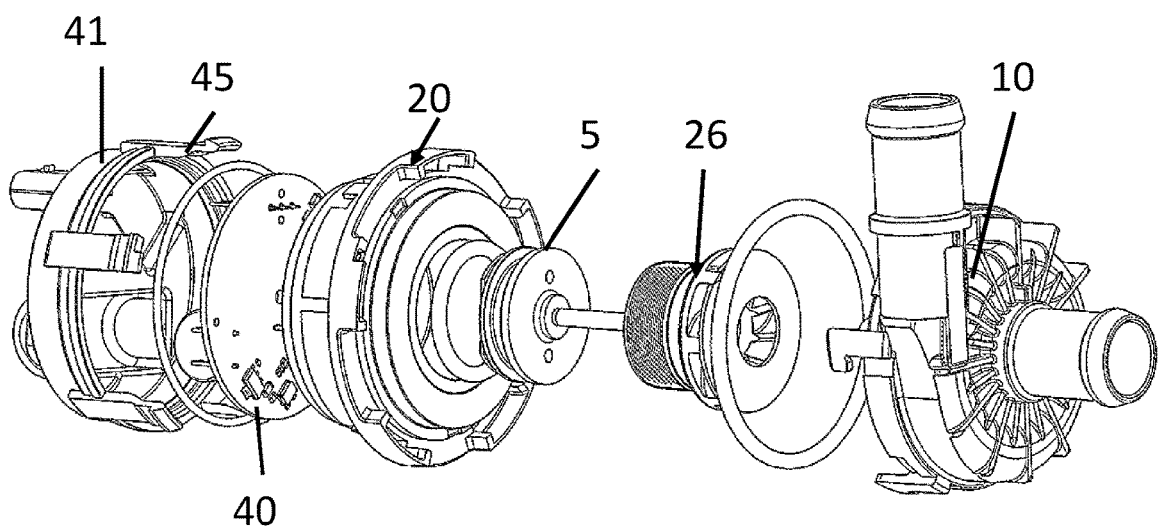
Figure 6:
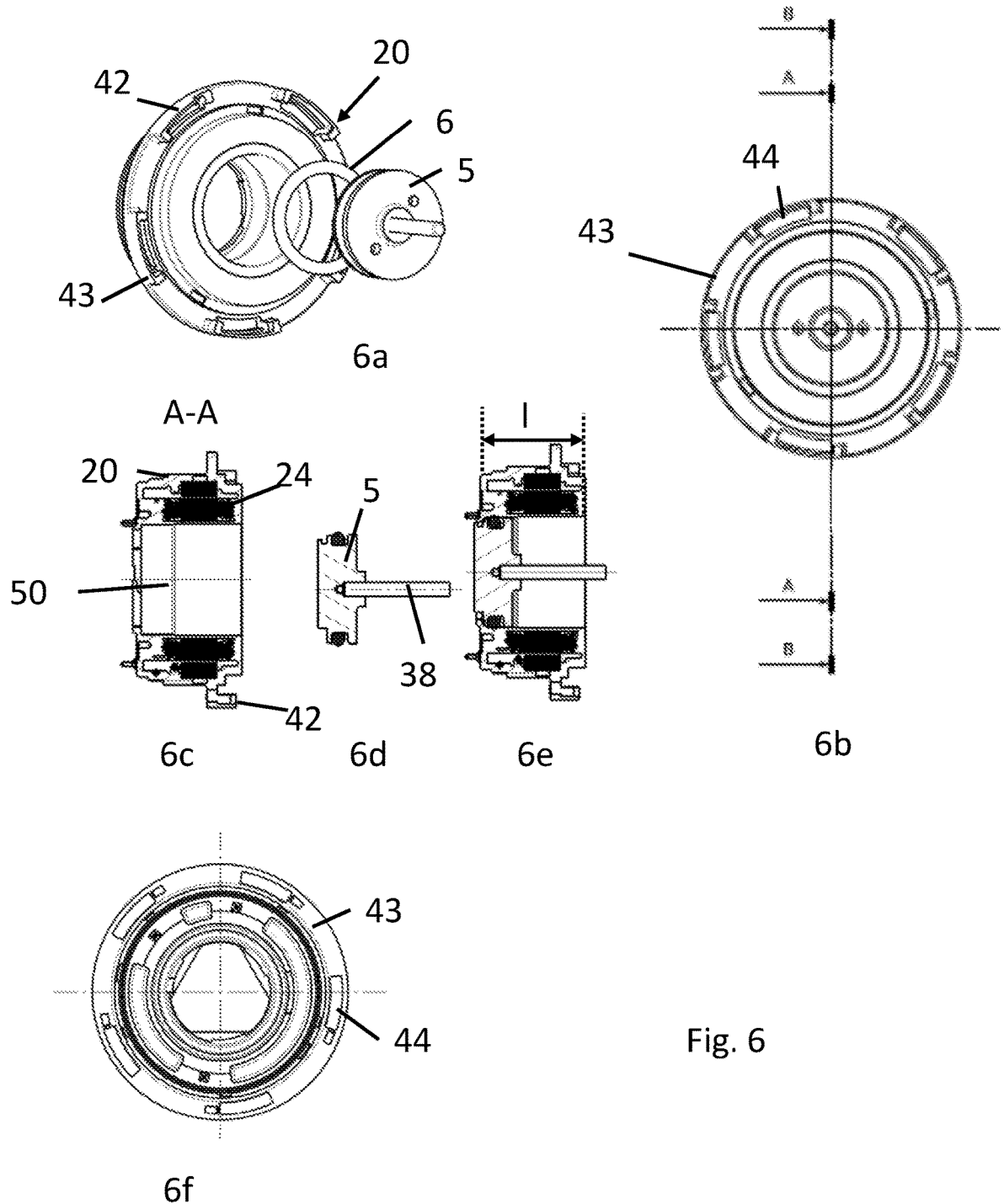
Figure 7:
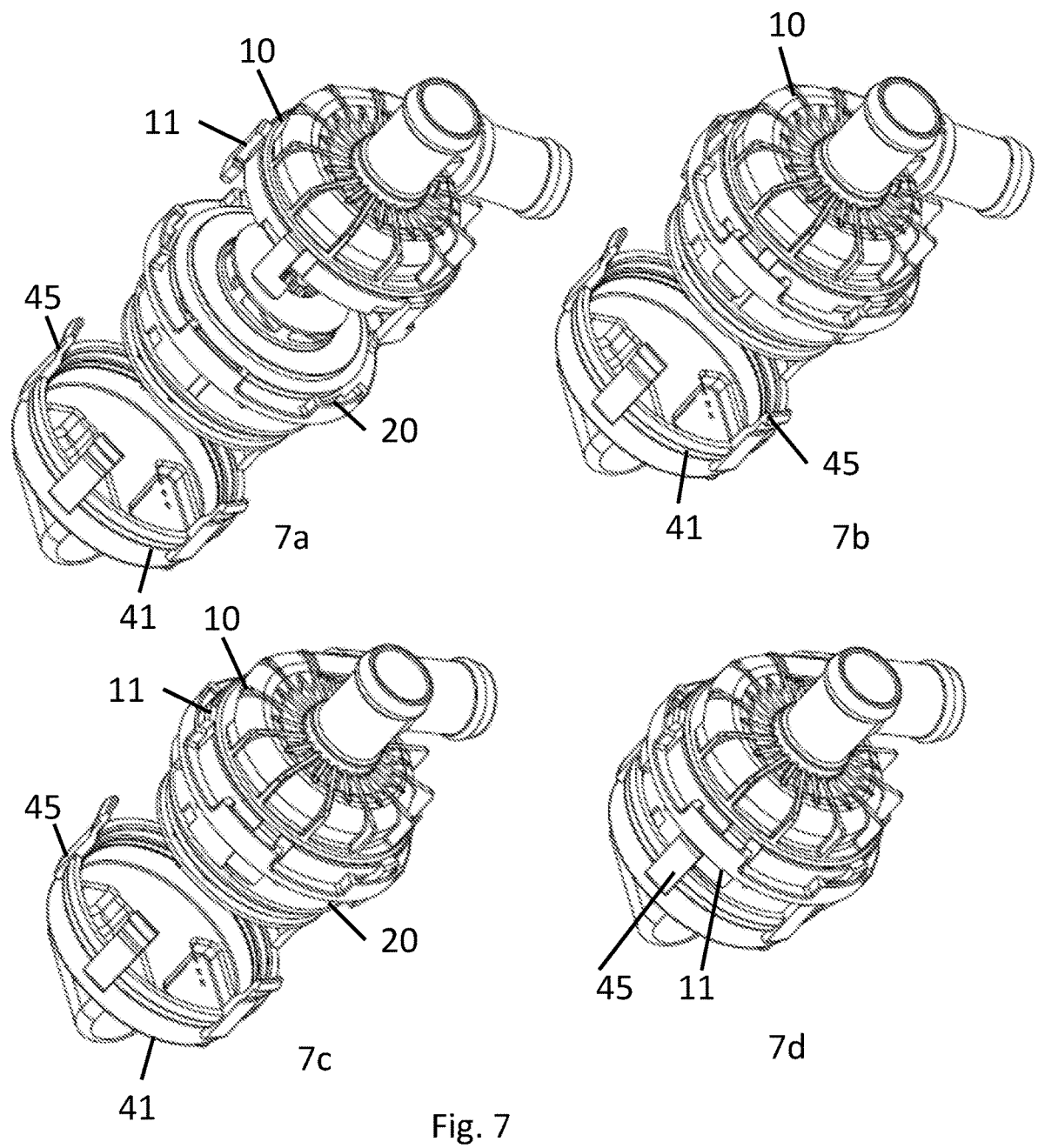
Figure 8:
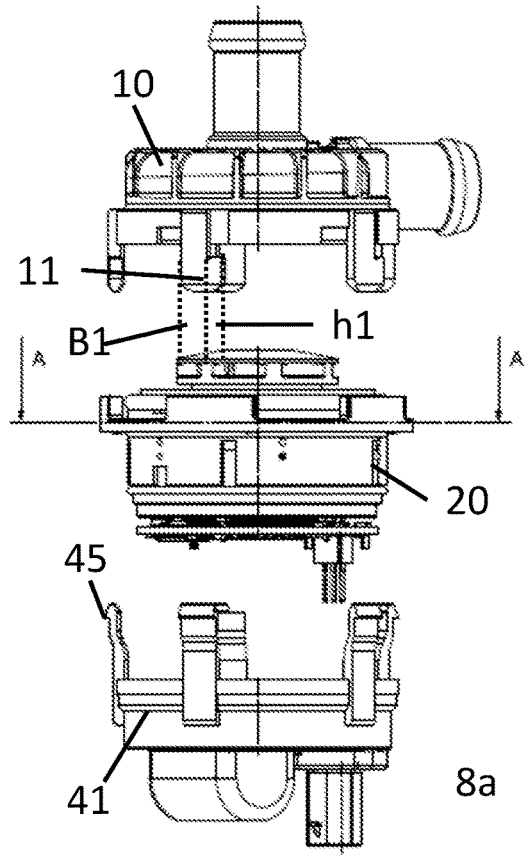
Figure 8:
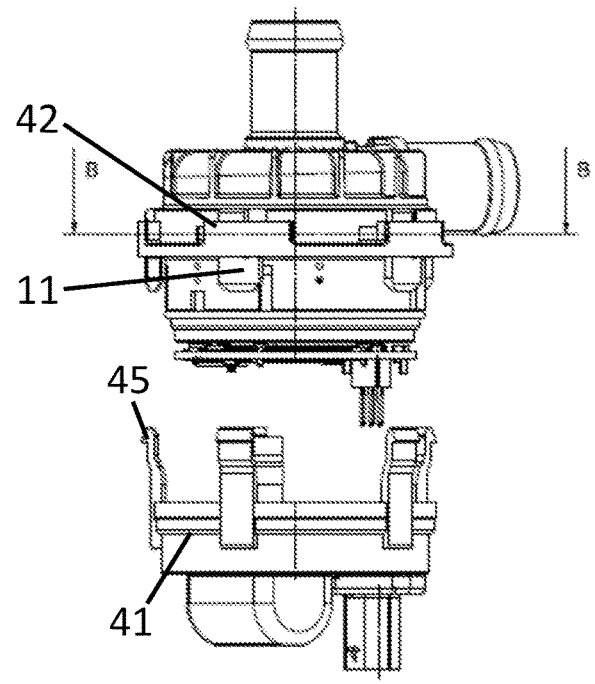
Figure 8:
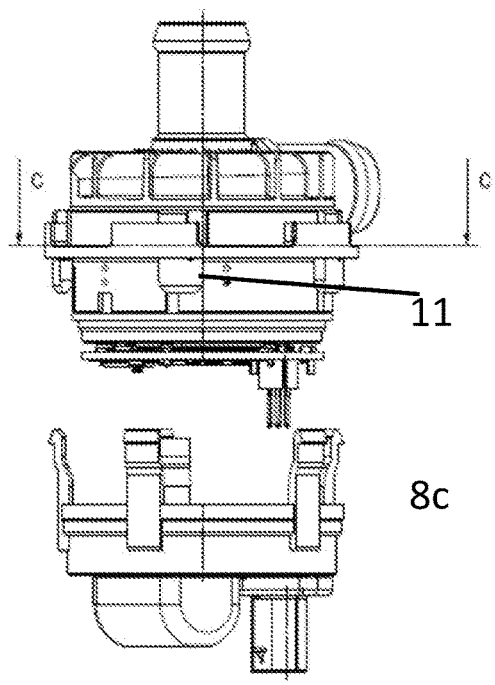
Figure 8:
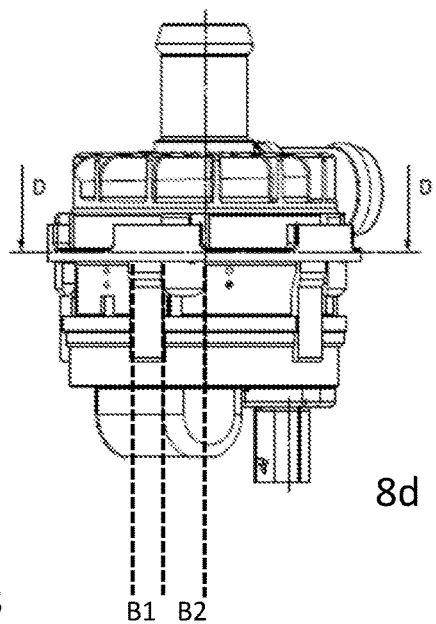
Figure 9:
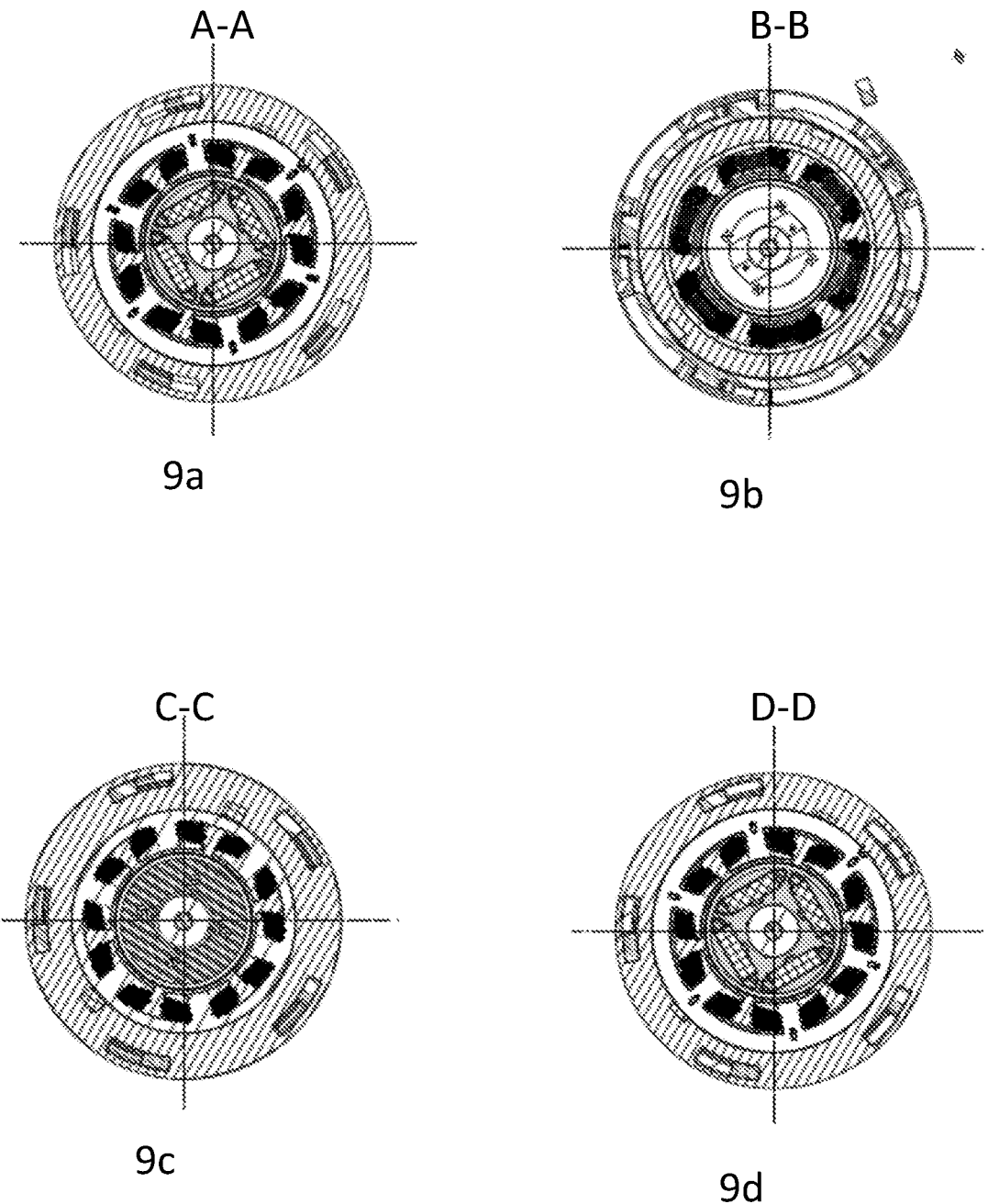

FIG. 1 shows a water pump as in state of the art and illustrates a cross sectional view of a housingless water pump 2, FIG. 2 shows a water pump according the disclosure, FIG. 3 shows a cross section of the water pump, FIG. 4 is an exploded side view of the pump, FIG. 5 is an exploded perspective view of the pump, FIG. 6 shows two central sections of the pump, and FIGS. 7-9 depict the mounting process of the water pump.

Corresponding reference numerals indicate corresponding parts throughout the several views of the drawings.

DETAILED DESCRIPTION

Example embodiments will now be described more fully with reference to the accompanying drawings.

The water pump 2 includes a volute 10, a boot 20, and a band clamp 22 attaching the boot 20 and the volute 10. The volute 10 includes an inlet 12 and an outlet 14. The volute includes a power supply connection 16.

The volute 10 is connected to a boot 20 via a band clamp 22 forming a cover 4, which encompasses the internal components and includes a power supply connection 16 for housing a supply line 46. The internal components of the housingless water pump 2 include a stator 24 press fit into the boot 20. The stator 24 surrounds a rotor 26. The rotor 26 is separated from the stator 24 by a wet sleeve 30. The rotor 26 and the stator 24 are separated by a magnetic air gap having a distance (A). The wet sleeve 30 prevents fluid from contacting the stator 24. The rotor 26 includes a shaft 38 and an impeller 28 for moving a fluid as the fluid enters the inlet 12. The impeller 28 moves the fluid through the outlet 14 for use. An electronic board 40 is located outside the wet sleeve 30 so that the electronic board 40 is separated from any fluids within the housingless pump 2.

FIGS. 2 to 9 shows an embodiment of the water pump with reduced parts, especially without wet sleeve, according the disclosure.

The pump 2 has a boot 20 that combines different functions: the boot defines the outer circumference of the pump, covers the stator 24 and a wet sleeve function and host a rotor 26. A heat sink 5 is mounted in the boot 20 wherein a rotor shaft 38 is seated. A sealing 6 in form of an O-ring seals the heat sink 5 versus the inner circumference of the boot 20 in an opening 50.

The boot 20 has the form of a cylindrical ring with the cylindrical opening 50 inside.

In the ring the devices of the stator are located in the opening the rotor 26 is mounted around the shaft 38.

The pump boot is prepared by over molding the stator 24 that eliminates air gaps between the different components as stator stack 7, supply pins 9 and copper wires 8. The over molding increases the heat dissipation of the stator.

The stator stack 7 is over molded during the process by a first material M1. The first material is for example a plastic material: PA66-GF30Glass. The material is fiber reinforced and has a good heat aging. The material M1 should have a high stiffness and dimensional stability and must be specified for producing electrically insulating parts.

After this first step of over molding the stator stack 7 the supply pins 9 are inserted and connected to the wires and the winding of wires 8 is finalized. After contacting wires and pins and an electrical control the package is over molded with a second material M2. The material M2 is for example PPS-GF34 that has a good resistance against aging, chemicals and radiation and forms a boot that is strong and rigid.

After the boot is completed as over molded single part a heat sink 5 bearing a shaft 38 is mounted along the inner circumference of the boot 20.

The heat sink 5 is sealed in the opening 50 with an O-ring 6 against the boot.

Alternative to the solution with the separate heat sink 5 the bottom of the boot can be closed by the molding process, including a seat for the shaft 38.

This closed solution could be applied if temperatures are lower than about 90°, creating a part that reduces the need of sealing.

An electronic board 40 is mounted on the surface of the boot 20 at the heat sink 5 apart from the impeller 28 portion.

The volume of air trapped around the electronic board 40 is reduced. This results in a increasing of heat transfer rates and a reduction of the overall volume of the water pump. In cases where it is necessary to fill the volumes with plastic molded material to keep the components stable the electronic board can be mounted before the last over molding process with material M2 takes place.

The electronic board and a first portion P1 of the length l of the boot is covered with part of a housing cap 41 a second portion P2 of the length l of the boot is covered by a part of a volute 10. The volute and the cap housing are sealed with O-rings versus the boot outer circumference.

In FIG. 6 the two central parts the boot 20 and the heat sink 6 are shown. FIG. 6a shows in an explosion view the boot made from plastic mold material having a cylindrical opening 50. The opening 50 better seen in FIG. 6c in a cross section along A-A of FIG. 6b is adapted to be closed on one side by the heat sink 5 as shown in FIG. 6d. FIG. 6e is the situation after the heat sink 5 with the sealing 6 is installed in the opening of the boot. FIG. 6f shows a view from the bottom of the boot after installation of the heat sink. In the embodiment of FIG. 6 a rim 43 is molded in the over mold process of stator 24.

The rim 43 surrounds the complete circumference of the boot 20 and extend to a larger diameter in comparison to the diameter of the boot. The rim is part of the mounting and fixing devices that are discussed later. The rim 43 includes in this embodiment four lugs 42 that surrounds slots 44 in the rim. The slots are arranged along a radial length and follow the radii of the boot. The lugs 42 are formed as walls surrounding the slots 44 at the outside circumference of the rim and partly two end faces of the slot.

In FIGS. 4 and 5 the parts of the whole water pump are shown in an explosion sketch. On the right side the volute 10 is shown as part of the final water pump. This volute 10 comprises axial hooks 11 which are arranged at the outer circumference of the device. The axial hooks 11 are defined by a hook structures 52 formed like a L and wherein the hooks are extending along the diameter of the volute 10. The openings of the hook structures 52 are arranged around the diameter so that the hook openings, the direction of the smaller arm of the L of two adjacent axial hooks are all apart from each other looking in the same direction. The hooks 11 do not increase diameter of the volute but only extend along the axial direction.

For assembling the water pump the boot 20 has the rim 43 with the slots 44. The cap housing 41 is designed with radial hooks 45 wherein the openings of the radial hooks are directed radial outside the diameter of the cap housing 41.

The radial hooks are mounted by tongues 53 that are fixed at the outer side of the cap housing, providing a defined flexibility. Normally the radial hooks are mold with the cap housing in one step.

In FIGS. 7, 8 and 9 the mounting process of the water pump is explained.

In a first step the volute 10 with the axial hooks 11 is put on the boot 20 and the axial hooks 11 enter into the slots of the rim 43 of the boot. For an easy insertion the slots 44 have rims 42 to guide the axial hooks 11 better. The insertion of the hooks 11 is so deep that the smaller arms of the L-formed axial hooks are completely put through the slots. The slot are broad enough to catch the hooks easily.

This insertion is also supported because the hooks are formed to follow the circumference contour of the volute, FIG. 8a, 8b.

In a second step the both parts, boot 20 and volute 10, are twisted along their central axis in the direction of the hooks' openings so that smaller arm of the L-formed axial hooks is overlapping the rim of the boot, as visible in FIG. 8c.

The volute is therefore fixed to the boot.

The slot 44 in the rim 43 is remaining broad enough to be able to be snap fitted to the radial hooks 45 of the cap housing 41.

The radial hooks 45 are flexible and it is possible to press them through the remaining space of the slot 44 to be fixed by the hooks' noses that extend outwardly.

The mounting and fixing method works with the two types of hooks in the two covering parts having together a broadness b1 and b2 to fill the space in the slots in the rim.

The hooks of the cap housing blocks a rotation of the volute back to the original mounting position and finalize the water pump assembly process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A water pump including an impeller driven by an electrical machine including a rotor, a stator stack, wires and pins, the water pump comprising:
    a housing cap;
    a volute including an inlet and an outlet;
    a boot hosting the stator stack and the rotor, the boot including a cylindrical opening;
    an electronic board positioned outside of the boot on an opposite side of the boot as the impeller, the electronic board being covered by the housing cap;
    a continuous and unitary support over-molding the stator stack, the support being a first plastic material, wherein the stator stack, the wires and the pins are over-molded with a continuous and unitary second plastic material, wherein the second material forms the boot, and
    a heat sink positioned within the cylindrical opening of the boot to sealingly close the cylindrical opening.

2. The water pump according to claim 1, wherein the heat sink is a separate device bearing a rotor shaft.

3. The water pump according to claim 1, wherein the heat sink is a device bearing a rotor shaft and is molded together with the boot.

4. The water pump according to claim 2, wherein the heat sink is sealed with an O-ring.

5. The water pump according to claim 1, wherein the electronic board is over molded together with the stator.

6. The water pump according to claim 1, wherein the boot has a radial extended rim that allows the volute and the cap housing to be connected.

7. The water pump according to claim 1, wherein the rim comprises at least slots.

8. A method to produce a water pump according to claim 1, comprising the steps:
    over molding the stator stack with the first plastic material,
    mounting at least the wires and the pins,
    over molding the mounted stator with the second plastic material to form the boot as a cylindrical ring with a rim, and
    sealing of the inner cylindrical opening by the heat sink.

9. The method according to claim 8, wherein the heat sink is molded together with the boot.

10. The method according claim 8, wherein the electronic board is over molded together with the stator stack.

11. The water pump according to claim 1, wherein the boot is disposed between the housing cap and the volute.

12. The water pump according to claim 1, wherein the volute is in receipt of the impeller.

* * * * *